US008910962B2

United States Patent
Meier et al.

(10) Patent No.: US 8,910,962 B2
(45) Date of Patent: Dec. 16, 2014

(54) VEHICLE SUSPENSION TRANSVERSE LINK

(71) Applicant: Ford Global Technologies, LLC, Dearborn, MI (US)

(72) Inventors: Christopher Meier, Köln (DE); Theo Kueppers, Waldfeucht (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/860,582

(22) Filed: Apr. 11, 2013

(65) Prior Publication Data

US 2014/0151974 A1   Jun. 5, 2014

(30) Foreign Application Priority Data

Apr. 12, 2012  (DE) .......... 10 2012 205 959

(51) Int. Cl.
*B60G 3/04* (2006.01)
*B60G 7/00* (2006.01)

(52) U.S. Cl.
CPC .......... *B60G 7/001* (2013.01); *B60G 2206/122* (2013.01); *B60G 2206/8201* (2013.01)
USPC ................................. 280/124.134

(58) Field of Classification Search
USPC ........ 280/124.134, 124.135; 403/26, 61, 152, 403/161, 163
See application file for complete search history.

(56) References Cited

U.S. PATENT DOCUMENTS

| 5,362,090 | A | * | 11/1994 | Takeuchi ............... 280/124.152 |
| 5,845,938 | A | * | 12/1998 | Kato ............................. 280/784 |
| 6,705,627 | B2 | * | 3/2004 | Hasebe et al. ......... 280/124.134 |
| 6,905,129 | B2 | * | 6/2005 | Runte et al. ............ 280/124.134 |
| 7,703,783 | B2 | * | 4/2010 | Miyawaki ............... 280/124.134 |
| 8,388,001 | B2 | * | 3/2013 | Mielke et al. .......... 280/124.134 |
| 8,434,770 | B2 | * | 5/2013 | Gerhards et al. ....... 280/124.125 |
| 2003/0034625 | A1 | * | 2/2003 | Runte et al. ............ 280/124.134 |
| 2012/0018974 | A1 | * | 1/2012 | Mielke et al. .......... 280/124.134 |
| 2012/0098228 | A1 | | 4/2012 | Wilson et al. |
| 2013/0285344 | A1 | * | 10/2013 | Meier et al. ............ 280/124.134 |

FOREIGN PATENT DOCUMENTS

| DE | 4330103 A1 | 3/1994 |
| DE | 69306902 T2 | 5/1997 |
| DE | 10024225 A1 | 11/2001 |
| DE | 102010001100 A1 | 7/2011 |
| EP | 1619054 B1 | 1/2006 |
| EP | 2409862 A2 | 1/2012 |
| JP | 06 211015 | 8/1994 |
| JP | 2002219918 A | 8/2002 |
| KR | 20090020799 A | 2/2009 |
| WO | 2010/105340 A9 | 9/2010 |
| WO | 2010105340 A1 | 9/2010 |

OTHER PUBLICATIONS

German Exam Report, DE 10 2012 205 959.8, dated Nov. 14, 2012.

* cited by examiner

*Primary Examiner* — Drew Brown
(74) *Attorney, Agent, or Firm* — Raymond L. Coppiellie; Brooks Kushman P.C.

(57) ABSTRACT

A vehicle suspension transverse link, including a bearing journal assembly having a pin-shaped portion and an anchor portion that attaches to a connecting point on the link. The anchor portion has an unrounded configuration.

9 Claims, 2 Drawing Sheets

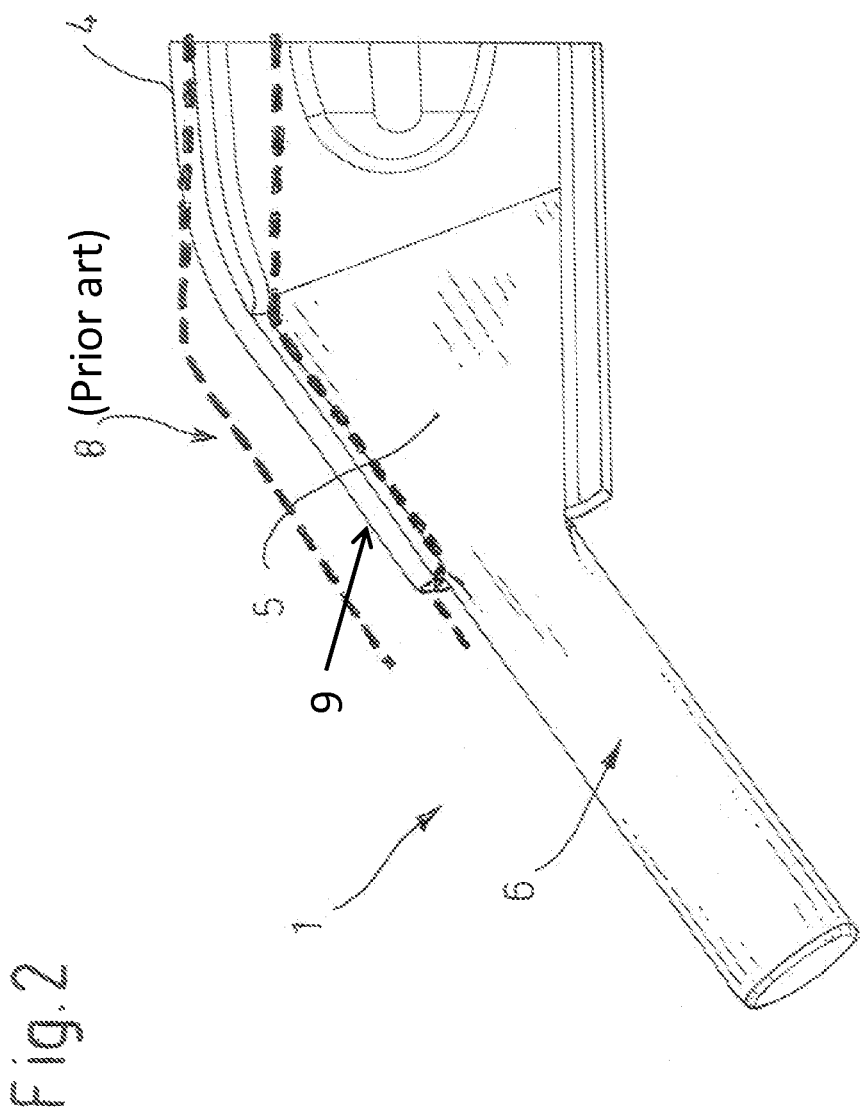

VEHICLE SUSPENSION TRANSVERSE LINK

CROSS-REFERENCE TO RELATED APPLICATIONS

This application claims priority to German Patent Application No. DE 102012205959.8 titled "Vehicle Suspension Transverse Link" filed Apr. 12, 2012, which is hereby incorporated by reference in its entirety.

TECHNICAL FIELD

The present disclosure relates to a transverse link for a motor vehicle.

BACKGROUND

Vehicle suspension transverse links can be subjected to dynamic loads during braking, acceleration and/or cornering maneuvers. Accordingly, the link sees relatively high stress and moments of inertia. Designs for suspension transverse links usually err on the side of heavier structural materials and more mass.

It is desirable, however, to have a less weighty suspension system.

SUMMARY

The present disclosure addresses one or more of the above-mentioned issues. Other features and/or advantages will become apparent from the description which follows.

One advantage of the present disclosure is that it teaches a flattened portion in a bearing journal for the transverse link that is substantially triangular or trapezoidal in shape. This permits a larger connecting surface between a bearing journal and a connecting leg than that which is provided in a conventional link, where the bearing journal is completely cylindrical.

A further advantageous refinement of the present disclosure is that the connecting leg has a recess in the region of the connecting point. Said recess makes it possible for the anchoring portion of the bearing journal to be welded to the connecting leg of the transverse link from two sides, specifically both from an underside and from a top side of the transverse link.

In another particularly advantageous refinement of the present disclosure, the transverse link is of a single-shell form, which has cost and weight advantages.

One exemplary embodiment relates to a transverse link for a vehicle, having: a connecting leg configured to connect the link to a vehicle body; a wheel leg attached to the connecting leg and configured to connect the link to a wheel carrier; and a bearing journal having a flattened anchoring portion secured to the connecting leg.

Another exemplary embodiment relates to a vehicle suspension transverse link, made by: (i) providing a connecting leg configured to connect the link to a vehicle body; (ii) providing a wheel leg attached to the connecting leg and configured to connect the link to a wheel carrier; (iii) flattening an anchor portion of a bearing journal having a flattened anchoring portion; and (iv) welding the anchoring portion of the bearing journal to the connecting leg.

Another exemplary embodiment relates to a vehicle suspension transverse link, having: a bearing journal assembly having a pin-shaped portion and an anchor portion that attaches to a connecting point on the link. The anchor portion has an unrounded configuration.

The invention will be explained in greater detail below by way of example with reference to the figures, in which the same reference numbers are used in the figures for identical or essentially identical elements. The above features and advantages and other features and advantages of the present teachings are readily apparent from the following detailed description for carrying out the invention when taken in connection with the accompanying drawings. In the figures:

BRIEF DESCRIPTION OF THE DRAWINGS

FIG. 2 is a cross-sectional view of the transverse link from FIG. 1 at circle 2.

DETAILED DESCRIPTION

Figure 1:
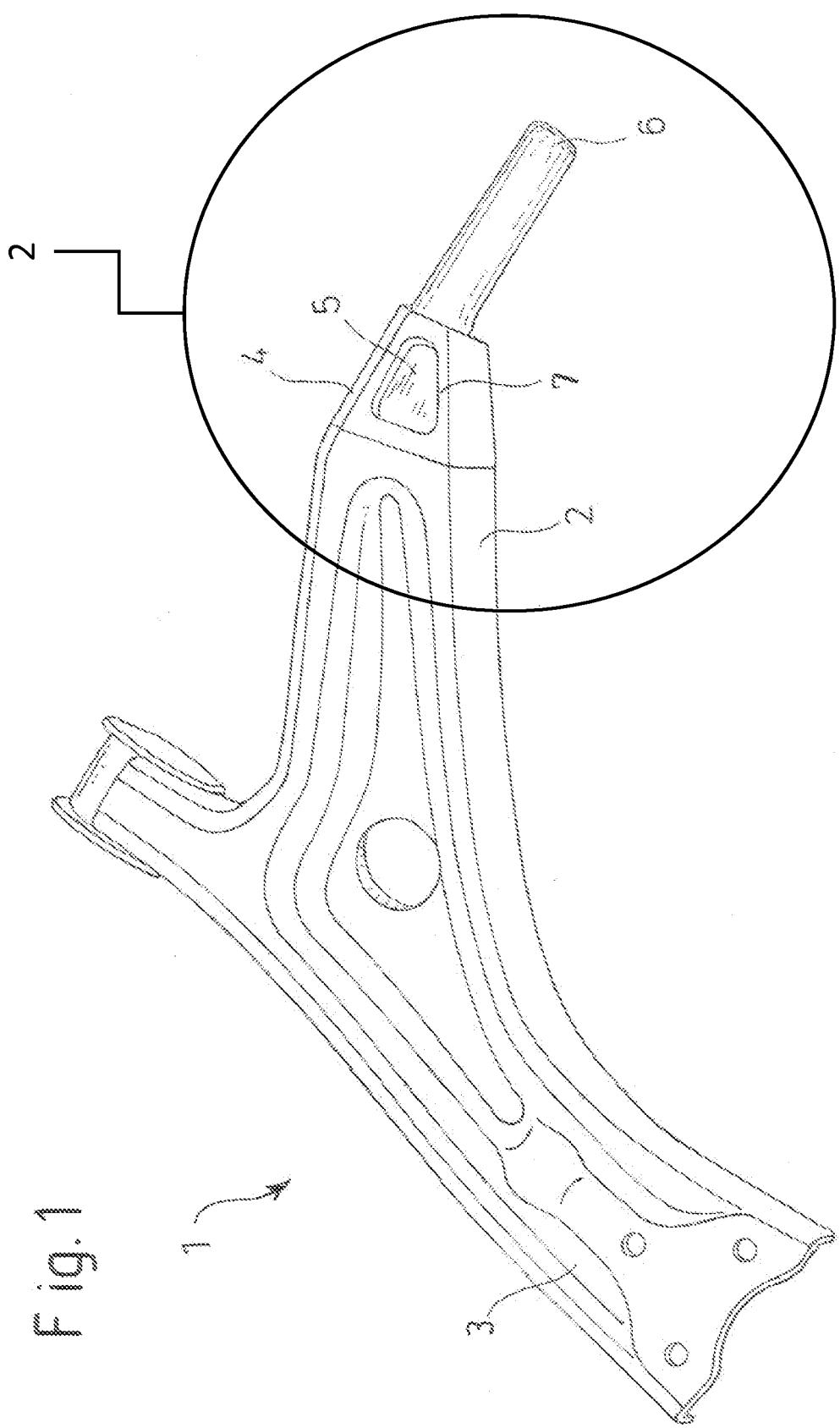
FIG. 1 is a perspective view of a transverse link according to an exemplary embodiment of the present disclosure.

Turning now to the figures, where like characters represent the same parts, there is shown therein a transverse link for use in a vehicle suspension.

With respect to FIG. 1, there is shown therein a perspective view of an exemplary embodiment of a transverse link 1. Link is of a single-shell form as described hereinbelow. The transverse link 1 has a connecting leg 2 for connecting a vehicle body thereto. Link also has a wheel leg 3 for connecting to a wheel carrier thereto. In this regard, the connecting leg 2 and the wheel leg 3 in the transverse link 1 illustrated in FIG. 1 form approximately an "L" shape. The connecting leg 2 has a connecting point 4 to which an anchoring portion 5 of a substantially pin-shaped bearing journal 6 (or bearing journal assembly) can be connected in a secure manner. It can also be seen in FIG. 1 that the connecting leg 2 has a recess 7 in the region of the connecting point 4. The recess 7 serves to allow access to the anchoring portion 5 of the bearing journal 6 such that the anchoring portion 5 can be welded to the connecting leg 2 from the top side of the link 1.

As can be seen in FIGS. 1 and 2, the bearing journal 6 is flattened at the anchoring portion 5. As shown in FIG. 2, a change in the bearing journal cross section occurs at a transition region between a part of the pin-shaped bearing journal 6 that is cylindrical and the anchoring portion 5 of the bearing journal 6. The flattened portion or flat surfaces occur at the transition region in this embodiment. In particular, the flattened portion of the anchoring portion 5 has a substantially tetragonal cross section. In a plan view of the anchoring portion 5, as illustrated in FIG. 2, it can be seen that the anchoring portion 5 is triangular or trapezoidal in shape. In the exemplary embodiment shown in FIGS. 1 and 2, the anchoring portion 5 is connected in a secure manner to the connecting point 4 of the connecting leg 2 by means of a cohesive connection, in particular a welded connection.

By means of the design of the anchoring region 5 of the bearing journal 6, it is possible for the profile of a front edge 8 of the connecting leg 2 to be configured such that more space is available between the connecting leg 2 and the vehicle body or subframe when the transverse link 1 is in an installed state. A transverse link according to the prior art has a front edge profile illustrated by dashed lines at 8, in relation to front edge 9 and other vehicle components of the transverse link 1. In this way, in particular more free space is created between the region of the front edge 9 when the transverse link 1 is installed in a vehicle subframe.

A material deformation of the transverse link that is more favorable with regard to fatigue can take place in particular in the region of the connecting point 4.

As can also be seen from FIGS. 1 and 2, the connecting leg 2 is formed, at least in the region of the connecting point 4, to be a hollow profile as viewed in cross section. The hollow profile at least partially surrounds the anchoring portion 5 of the bearing journal 6 and thus provides the anchoring portion with a certain degree of additional lateral guidance and hold.

In assembly, the bearing journal can, for example, be plugged into a bearing bushing that is connected to the vehicle body or to a subframe.

The flattened portion of the bearing journal anchoring portion is characterized by a change in the bearing journal cross-section. In particular, a substantially circular bearing journal cross-section of the bearing journal changes into a substantially tetragonal cross-section at the anchoring portion. The anchoring portion can preferably be connected in a secure manner to the connecting point of the transverse link connecting leg by any number of means, e.g., a cohesive connection, such as a welded connection. Other plausible locking connections include, for example, riveted connections.

The bearing journal flattened in the anchoring portion yields a significantly more compact and space-saving design for the transverse link, in particular in the region of the connecting point where the pin-shaped bearing journal can be connected.

Those familiar with the art to which the invention relates will recognize various alternative designs and embodiments for practicing the invention within the scope of the appended claims.

We claim:

1. A transverse link for a vehicle, comprising:
    a connecting leg configured to connect the link to a vehicle body;
    a wheel leg attached to the connecting leg and configured to connect the link to a wheel carrier; and
    a bearing journal having a pin-shaped portion angled towards the wheel leg, and a transition region defining a flattened anchoring portion having a trapezoidal or triangular configuration secured to the connecting leg, wherein the connecting leg includes a recess region formed proximate a hollow connecting point at least partially surrounding the anchoring portion of the bearing journal, wherein the recess is configured to allow access to the anchoring portion from a top side and an underside of the transverse link.

2. A method of making a vehicle suspension transverse link, comprising:
    providing a connecting leg, having a front edge profile curved away from a vehicle body and a hollow connecting point configured to receive a bearing journal having an anchor portion with a trapezoidal configuration and a pin-shaped portion angled generally towards the vehicle body;
    flattening an anchor portion of a bearing journal; and
    welding the anchor portion of the bearing journal to the connecting leg.

3. The method of claim 2, further comprising:
    forming the anchor portion in a triangular or trapezoidal configuration.

4. The method of claim 2, further comprising:
    forming a hollow recess proximate the connecting point between the bearing journal and connecting leg.

5. The method of claim 2, wherein a cross-section of the bearing journal changes from a substantially circular cross-section proximate the pin-shaped portion to a substantially tetragonal cross-section proximate the anchoring portion through a transition region.

6. A vehicle suspension transverse link, comprising:
    a connecting leg including a hollow recess; and
    a bearing journal including a pin-shaped portion having a cylindrical cross-section, a transition region having a tetragonal cross-section proximate a triangular-shaped anchor portion that attaches to a connecting point proximate the recess, wherein the anchor portion has a first cross-section proximate the pin-shaped portion and a second cross-section proximate the connecting point, wherein the first cross-section is less than the second cross-section.

7. The transverse link of claim 6, wherein the anchor portion includes a flat portion having a first edge spaced apart from and extending generally away from a second edge.

8. The transverse link of claim 6 wherein a cross-section of the bearing journal changes proximate the transition region, wherein the anchoring portion is positionally secured within the connecting leg by a welded connection.

9. The transverse link of claim 6 wherein the connecting leg is provided with a front edge, disposed between the connecting point and a first end of the connecting leg, the front edge curved generally away from a vehicle body.

* * * * *